US 007424335B2

(12) United States Patent
Swift (10) Patent No.: US 7,424,335 B2
(45) Date of Patent: Sep. 9, 2008

(54) IDENTIFICATION OF TERRESTRIAL FOLIAGE LOCATION, TYPE AND HEIGHT FOR SCALED PHYSICAL MODELS

(76) Inventor: Lawrence W. Swift, 12316 Rivers Edge Dr., Potomac, MD (US) 20876

( * ) Notice: Subject to any disclaimer, the term of this patent is extended or adjusted under 35 U.S.C. 154(b) by 293 days.

(21) Appl. No.: 11/485,083

(22) Filed: Jul. 12, 2006

(65) Prior Publication Data

US 2007/0011982 A1     Jan. 18, 2007

Related U.S. Application Data

(60) Provisional application No. 60/698,707, filed on Jul. 13, 2005.

(51) Int. Cl.
    *G06F 19/00* (2006.01)
(52) U.S. Cl. .................................. 700/98; 700/159
(58) Field of Classification Search ............ 700/95–98, 700/117–121, 159, 182; 706/919; 703/1; 434/72, 93, 150
    See application file for complete search history.

(56) References Cited

U.S. PATENT DOCUMENTS

| 5,975,908 | A   |     | 11/1999 | Hulten |
| 6,338,027 | B1  | *   | 1/2002  | Fulton ........................ 702/127 |
| 6,760,693 | B1  |     | 7/2004  | Singh et al. |
| 7,042,468 | B2  |     | 5/2006  | Schwegler et al. |
| 7,142,984 | B2  | *   | 11/2006 | Rahmes et al. ................. 702/5 |
| 7,191,066 | B1  | *   | 3/2007  | Rahmes et al. ................. 702/5 |
| 7,216,003 | B2  |     | 5/2007  | Faulkner et al. |
| 2001/0047251 | A1 |   | 11/2001 | Kemp |
| 2003/0014224 | A1 |   | 1/2003  | Guo et al. |
| 2005/0058971 | A1 | * | 3/2005  | Bugosh ...................... 434/151 |
| 2005/0196542 | A1 |   | 9/2005  | Cooper |
| 2006/0004476 | A1 |   | 1/2006  | Ferren et al. |
| 2006/0025971 | A1 | * | 2/2006  | Detwiler et al. ................ 703/1 |
| 2006/0075718 | A1 |   | 4/2006  | Borne et al. |
| 2006/0108712 | A1 |   | 5/2006  | Mattes |
| 2006/0136179 | A1 |   | 6/2006  | Sit |
| 2006/0230984 | A1 |   | 10/2006 | Bredt et al. |

OTHER PUBLICATIONS

Durbin, et al. "Battlefield Visualization on the Responsive Workbench." IEEE Visualization '98 conference proceedings, IEEE 1998.

* cited by examiner

*Primary Examiner*—M. N. Von Buhr
(74) *Attorney, Agent, or Firm*—Roberts Mardula & Wertheim, LLC (57) ABSTRACT

A method for identifying modeling characteristics of items of foliage on a piece of real property so that the property's foliage can be accurately modeled on a site model portion of an architectural model. The characteristics determined for each item of foliage is its location (in longitude and latitude within the property), type (evergreen tree, deciduous tree, shrub), and height. The determinations of characteristics are carried out via automated analysis (including spectral analysis) of satellite imagery or aerial imagery of the selected piece of real property. The height information and type information is used to select appropriate miniature foliage to model each identified foliage item, and the location information is used to place the selected miniature foliage accurately on the site model.

20 Claims, 5 Drawing Sheets

IDENTIFICATION OF TERRESTRIAL FOLIAGE LOCATION, TYPE AND HEIGHT FOR SCALED PHYSICAL MODELS

CROSS REFERENCE TO RELATED APPLICATIONS

This application claims priority benefit under 35 U.S.C. § 119(e) from provisional application no. 60/698,707, filed Jul. 13, 2005. The 60/698,707 application is incorporated by reference herein, in its entirety, for all purposes.

This application also relates to co-pending applications by the same inventor of this application and entitled "Building of Scaled Physical Models" (Application No. 11/484,945, filed Jul. 12, 2006), "Applying Foliage and Terrain Features to Architectural Scaled Models" (Application No. 11/484,944, filed Jul. 12, 2006; now issued as U.S. Pat. No. 7,343,216), and "Determination of Scaling for Architectural Models" (Application No. 11/485,084, filed Jul. 12, 2006).

FIELD OF THE INVENTION

The invention relates generally to architectural processes of building physical models to develop and communicate building design concepts. In particular, the invention relates to a process for identification and placement of miniature foliage (trees and/or shrubs) on scaled physical models that are reflective of the actual foliage on an actual building site.

BACKGROUND OF THE INVENTION

Architects, builders, and real estate developers have been building physical representations (models) of their design concepts for centuries to help them both develop their design and communicate that design to their clients. These models typically involve the fabrication of a building model (typically a residential house or commercial building), the fabrication of a site model of the property's terrain, and the placement of miniature facsimile trees and/or shrubs on the site model.

The building model is a scaled three dimensional model that represents the architect's design of the proposed building. These building models have traditionally been fabricated by hand using cardboard-type materials ("chipboard" is a popular medium) by architects and/or model builders using X-ACTO® knives and glue to manufacture a miniature scaled model of the building design. Other materials can also be used such as plastics or metals, which are often cut to size using laser cutters.

The site models are typically scaled topographical representations of the land on which the building is to be constructed. The typical approach to constructing these site models is to cut out and stack-up cardboard layers, with each cut out layer representing a land elevation contour.

Once the building model and site model have been integrated together to form a combined model, the final assembly stage of the combined model is the placement of miniature foliage representing trees and/or shrubs. The miniature foliage may be simply decorative (i.e., randomly place on the site model with no correlation to the actual location of plants), or it may be a representation of the actual positioning of foliage that is intended to occupy the site with the building as part of an architect's landscape design.

In situations where the placement of foliage items on the site model needs to reflect the actual foliage existing on the property, the traditional approach has been to send a survey team to go to visit the property and survey each foliage element for location, type, trunk diameter and possibly height. This approach, although highly accurate, is time consuming, labor intensive, and expensive.

What is needed is a way of obtaining a reasonably accurate survey of the location, type, and size of foliage existing on a particular property without the delay and expense of an onsite survey by a survey team.

SUMMARY OF THE INVENTION

According to various embodiments of the present invention a method identifies the location, type and height of foliage on a selected property. The identified information is useful for placement of miniature foliage in site model representing the selected property. The method comprises identifying the location of the property and collecting imagery data relating to the property. The imagery data is analyzed to determine location, type, and height of the foliage.

One aspect of the present invention is that it utilizes airborne and/or satellite imagery to identify a property's foliage location, type (i.e. evergreen tree vs. deciduous tree) and height in an automated fashion for use in the placement of miniature foliage in the site model.

This invention significantly reduces the time and cost associated with gathering information about foliage location, type and height and the resulting placement for representation of that foliage in architectural models.

One embodiment of the present invention is directed to a method for identifying modeling characteristics of foliage items on a predetermined real property and placement of model foliage in an architectural model. This method includes identifying the location of the real property relative to objective coordinates and collecting imagery data corresponding to the identified location of the real property. The imagery data is georeferenced to the identified location of the real property. The imagery data is then analyzed to identify the foliage items on the real property, and is further analyzed to determine, for each of the identified foliage items, location information, type information, and height information. Each identified foliage item is georeferenced to the identified location of the real property. A computer numerically controlled (CNC) data file corresponding to the real property is modified to include instructions to drill holes for placement of model foliage based upon modeling characteristics and georeferenced information identified for the foliage items and stored in the respective foliage item data files.

Another embodiment of the present invention is directed to a method for integrating model foliage into a site model corresponding to a predetermined real property. This method includes identifying the location of the real property relative to objective coordinates and collecting imagery data corresponding to the identified location of the real property. The imagery data is georeferenced to the identified location of the real property. The imagery data is then analyzed to identify the foliage items on the real property, and is further analyzed to determine, for each of the identified foliage items, location information, type information, and height information. Each identified foliage item is georeferenced to the identified location of the real property. A computer numerically controlled (CNC) data file corresponding to the real property is modified to include instructions to drill holes for placement of model foliage based upon modeling characteristics and georeferenced information identified for the foliage items and stored in the respective foliage item data files. A subtractive manufacturing device is commanded to fabricate the site model based upon the modified computer numerically controlled (CNC) data file. Model foliage items are then placed on the site model corresponding to the real property based upon the identified modeling characteristics.

A further embodiment of the present invention is directed to a method for integrating model foliage into a site model corresponding to a predetermined real property. This method includes identifying modeling characteristics of foliage items on the real property based substantially on spectral analysis and georeferencing of the foliage items, and modifying a computer aided manufacturing (CAM) program file (using any of various programming codes, e.g., G-code, M-codes, DNC conversational, or APT code) corresponding to the real property to include instructions to drill holes based upon modeling characteristics identified for the foliage items. A subtractive manufacturing device is commanded to fabricate the site model based upon the modified CAM program file. Model foliage items are then placed on the site model corresponding to the real property based upon the identified modeling characteristics.

DETAILED DESCRIPTION

One embodiment of the present invention is a process by which satellite and/or aerial imagery is used to identify the location, type and height of trees and/or shrubs (collectively, foliage) on a given property. This identified information is useful for building an accurate scaled physical site model of that property for use in an architectural model.

Figure 1:
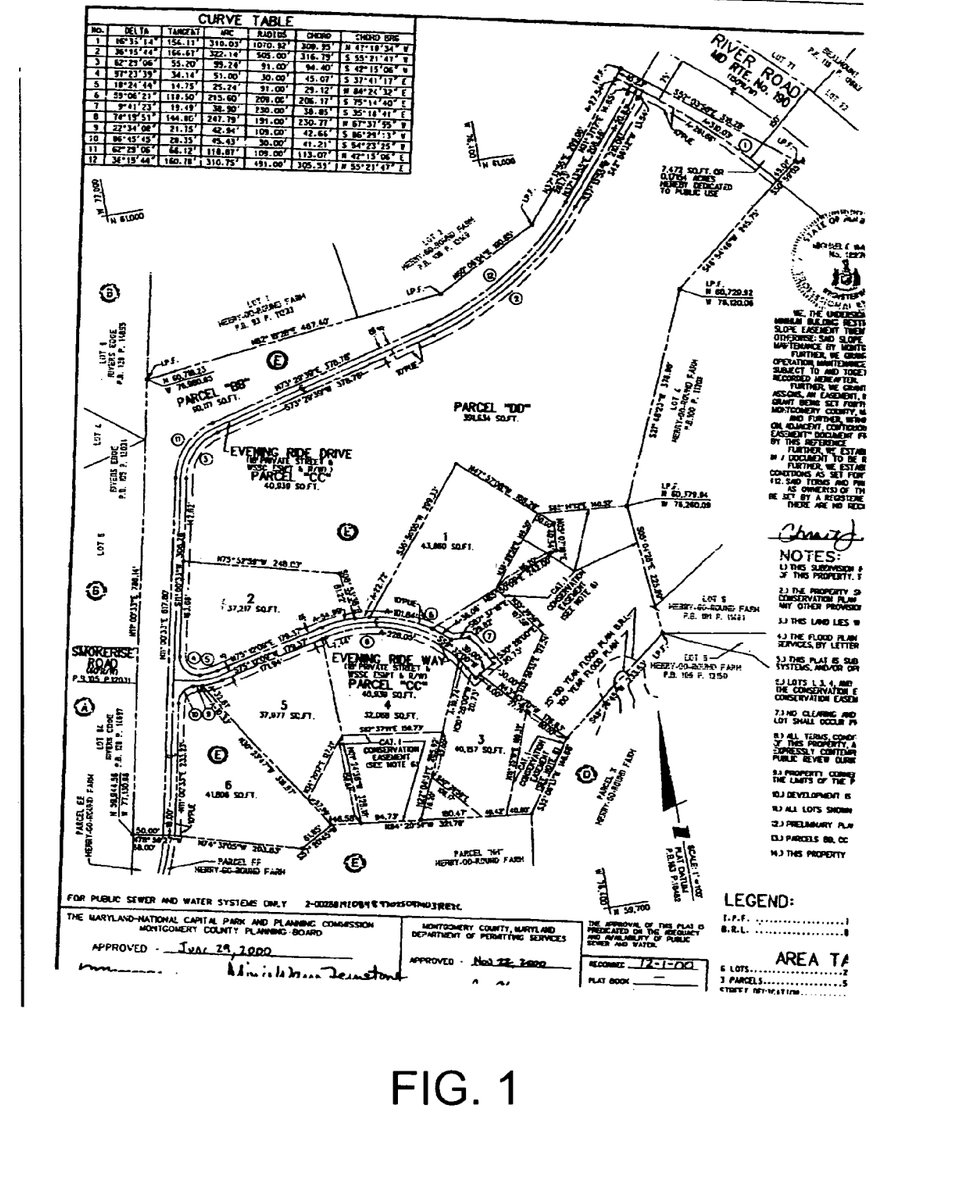
FIG. 1 illustrates a reproduction of a land plat useful in practice of the present invention.
Figure 3:
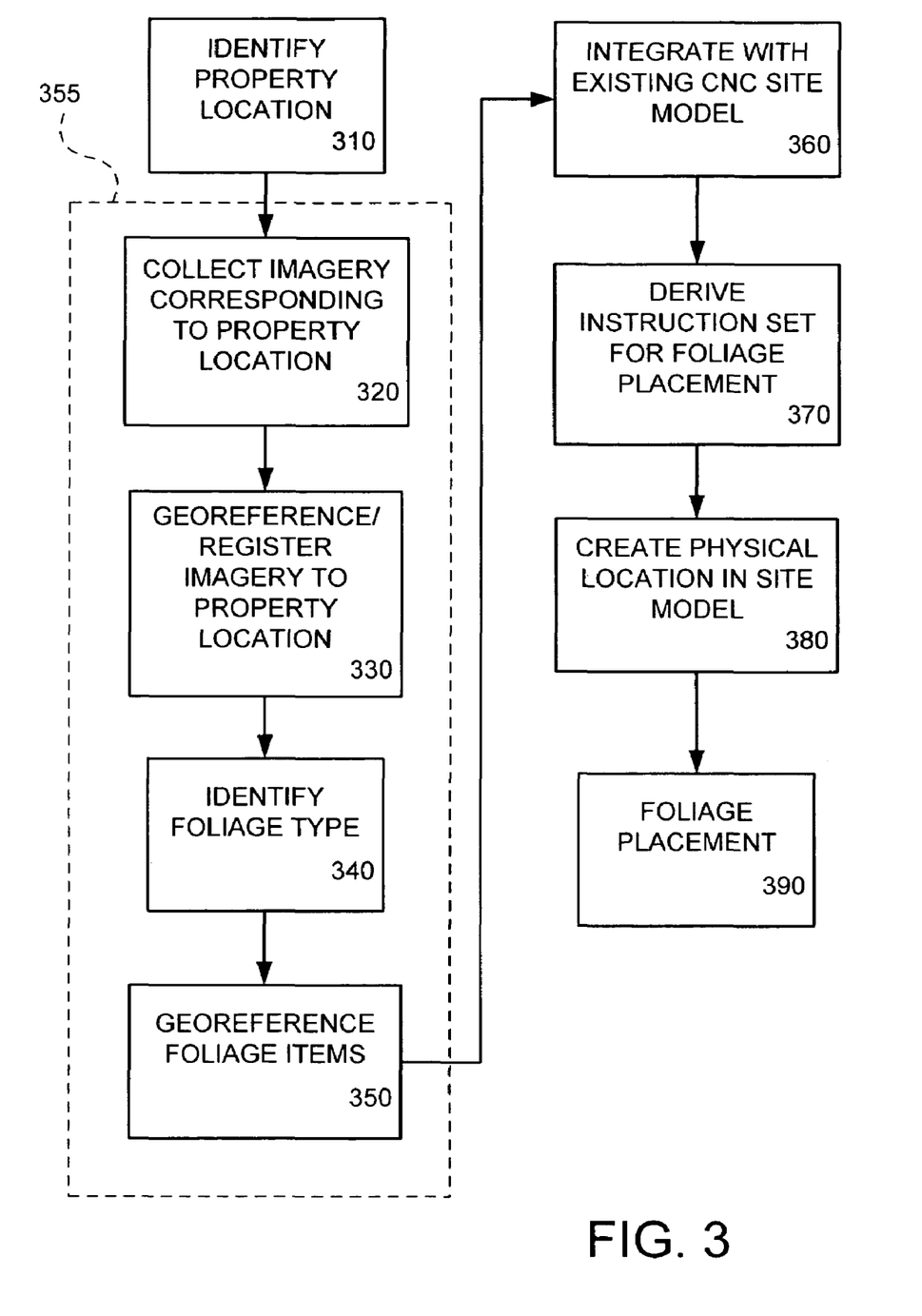
FIG. 3 illustrates a flowchart showing the process flow of a method for determining model foliage items according to the present invention.

Referring to FIG. 3, the process flow of one embodiment of the present invention is illustrated. Identification and location of the property of interest is first established 310. To do this, the property location's boundaries are geo-referenced. This provides the boundaries of the property of interest in terms of longitude and latitude. This information is typically obtainable from civil government agencies responsible for keeping track of land records in the form of a land plat, an example of which is shown in FIG. 1.

Figure 5:
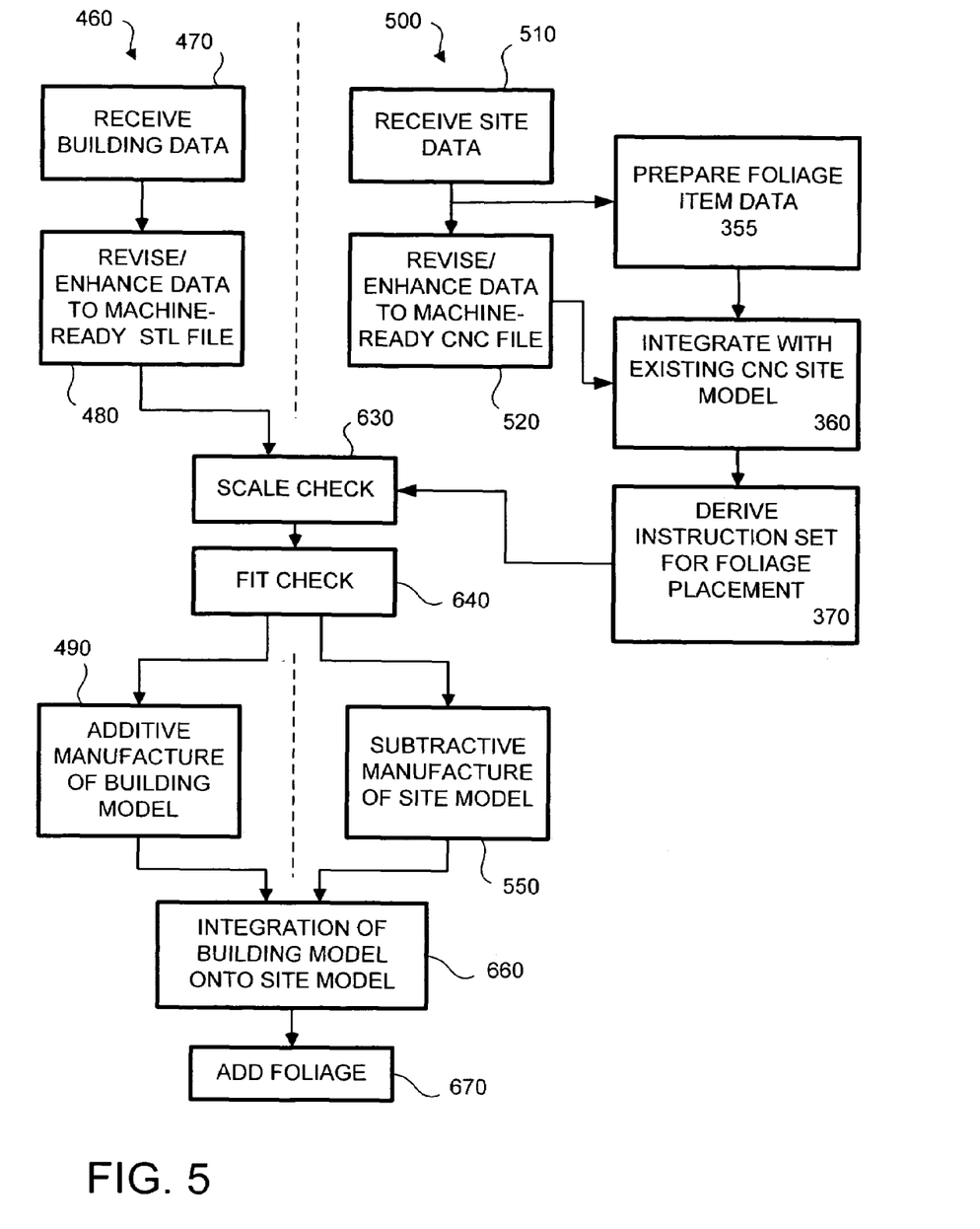
FIG. 5 illustrates a flowchart showing the process flow of a method for determining model foliage items according to an embodiment of the present invention.

Referring to FIG. 5, a flowchart for a process by which architectural electronic design data can be used to build scaled physical models is illustrated, including identification of foliage according to the present invention. The process has a process flow 460 for making the building model, which is mostly separate from a process flow 500 for making the site model. The building model process flow 460 and the site model process flow 500 are conceptually parallel to one another and may be executed substantially contemporaneously with one another.

The building model process flow 460 begins with the reception 470 of building model data from an architect or designer. The format the building model data is received in is any format known to those skilled in the art so long as it can be transformed or translated into a format that is compatible with CAD software. For example paper format blueprints can be scanned and captured to be placed into an electronic form. Non-3D formats are translated into a 3D format either by conversion or design translation. Thus, 2D CAD files, 3D CAD files, and .stl files can all be received into and utilized for a process according to this invention. For ease of description, the process as described below will presuppose that the building model data has been either delivered in, or has been converted into, the standard stereolithography output format which is known in the CAD art and for which the files have the file extension ".stl" (a standard output format for almost all 3D CAD software programs).

A building model .stl file received from the architect or designer contains a complete description of the building model design, and is output from the architect's 3D CAD software package. Once received, the .stl file is examined to ensure suitability for manufacturing in additive manufacturing equipment 200 (refer to FIG. 1), which is commonly referred to as "rapid prototyping" equipment. Three dimensional printers are additive manufacturing machines 200 suitable for implementing the invention, and are commercially available as products manufactured by Z Corp, Stratasys, and 3D Systems.

A search of the data file is conducted for anomalies that would prevent successful manufacturing of the building model "part." Any such anomalies identified are modified or repaired 480 so that manufacture of the model can be accomplished. Examples of repairs that are typically effected include making parts be "water tight" (i.e., no gaps, holes, or voids in the model), and insuring that no features are below minimal manufacturing tolerances. Commercially available software programs are available for this purpose, such as Materialise's Magics, or proprietary analysis software may be used. Additional changes to the electronic model (e.g., changing the size of railings or fence posts) may be useful and can be accomplished with the use of 3D CAD programs. Examples of 3D CAD programs that can be successfully used to do this are Rhino, FormZ, AutoCAD, and SolidWorks. As an alternative, .stl manipulation programs (such as Magics) can be used to make the changes to revise the building model data file.

Once the building model .stl file is determined to be suitable for manufacturing, a check 630 is made to ensure that the site model and the building model are of the same scale. For example, a check is made to confirm that both are "16th scale," which means that 1 inch represents 16 feet at full scale. Additionally, a fit check 640 is made to make sure that they building model can be attached to the site model.

If both these checks are met, the building model .stl file is submitted 490 to the additive manufacturing equipment to be built. The process this equipment performs is referred to as an "additive" process, since the part (in this case the building model) is typically built up one layer at a time by the rapid prototyping manufacturing equipment. Various types of media (e.g., plastic or plaster) can be used by the equipment to make the building models, and the media may be colored depending on the manufacturer and rapid prototype equipment selected.

Various post processing efforts are performed, depending on the additive manufacturing equipment selected. For example, when using a Z510 model three dimensional printer manufactured by Z Corp., once the building model is built up and has had suitable time to dry, the part is excavated from the Z510 machine and "de-powdered" to remove all excess material. The de-powdering is done because the Z510 uses a plaster-like powder material as its medium to build the parts it makes. The de-powdered building model can then be "infiltrated" with any of a variety of waxes, urethanes, or resins, depending on the desired surface characteristics for the building model. Once infiltrated, the building model may be hand finished as necessary to ensure the desired look, quality and finish.

After the post processing efforts have been completed, the fabricated building model is ready to be attached 660 to the site model.

The site model process flow 500 can be performed in parallel to the building model process flow 460 to minimize overall process completion time.

The site model process flow 500 begins with the reception 510 of site model data from the architect, designer, or survey engineer. The site model data can be in various formats. Either paper format (e.g., plats) or electronic format (e.g., 2D CAD files, 3D CAD files, .stl files, etc.) can be utilized in the process. In order to be manufactured, non-3D formats must be translated into 3D formats, either by conversion or design translation. For ease of description, the process as described below will presuppose that the site model data has been either delivered in, or has been converted into, the standard stereolithography output format which is known in the CAD art and for which the files have the file extension ".stl".

Once ready, the .stl file is converted 520 into a CAM program which can ouput a programming language (i.e., G-Code) that is used by subtractive manufacturing equipment, such as a CNC machine tool (e.g., a CNC milling machine or a CNC routing machine). This conversion can be done with off-the-shelf CAM (Computer Aided Manufacturing) software programs such as ArtCAM by Delcam plc (www.artcam.com).

Before being sent to the subtractive manufacturing equipment to fabricate the site model, the CAM program file (such as a G-Code file) will be further modified to accommodate information regarding foliage. Based on site data, foliage item data is prepared 355 to be used in modifying the CAM program.

Collection of satellite or aerial data covering the property of interest is then accomplished 320 (refer to FIG. 3). Data sources of satellite imagery and/or aerial imagery for the selected property are identified. Examples of data sources that are useful to provide such data can be found on readily accessible Internet web sites are: earth.google.com, www.terraserver.com, and www.airphotousa.com. Government agencies responsible for agriculture or mapping are also useful sources of such data, for example at geography.usgs.gov/partners/viewonline.html. Other public and private sources may be used.

Figure 2:
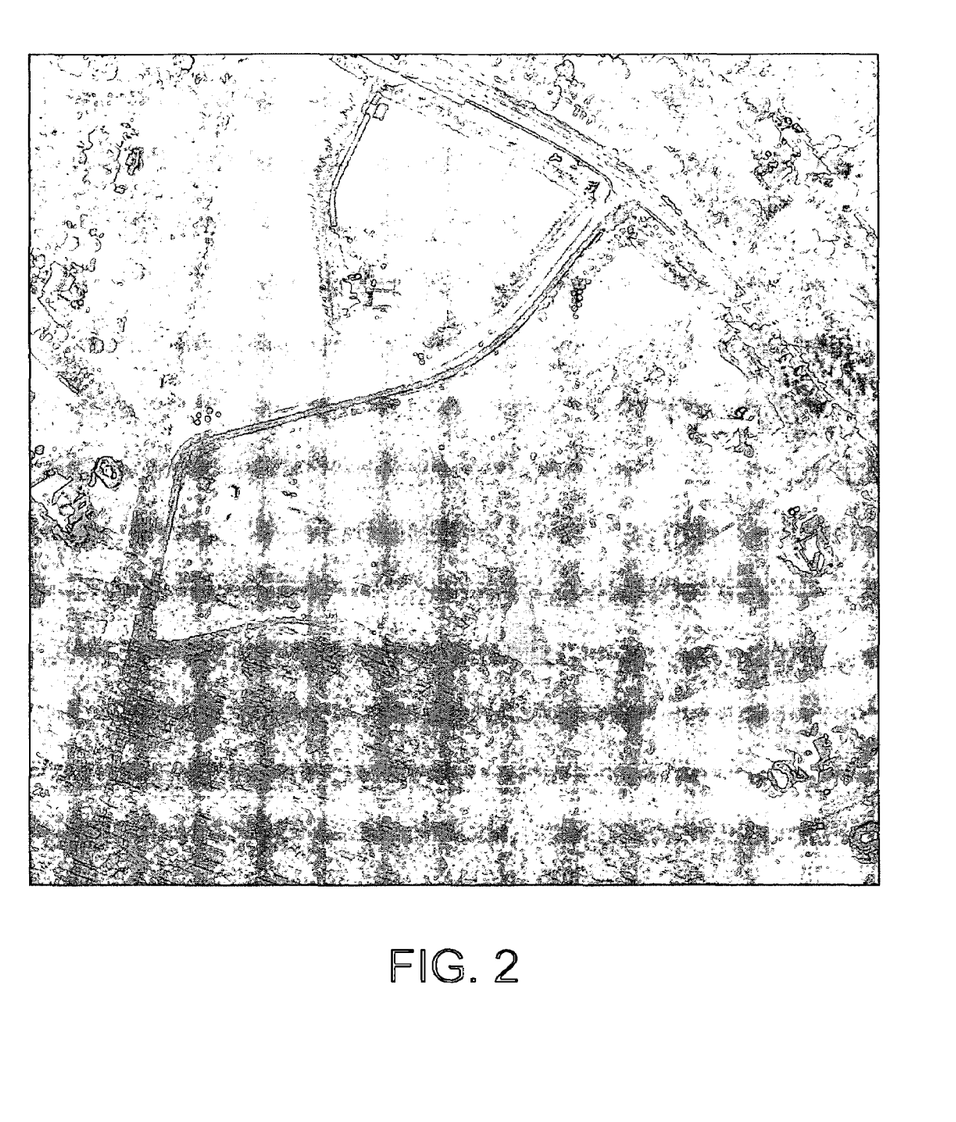
FIG. 2 illustrates an aerial image of land corresponding to the land plat of FIG. 1, which is useful in practice of the present invention.

The preferred sources of imagery data (either satellite or aerial) are digital, have a resolution of less than 1 meter per pixel, are in color, and are taken with LIDAR (LIght Detection And Ranging) technology. These preferred image characteristics are not required for practice of the invention. However, in general the better the resolution, the better will be the quality of foliage analysis. An example of aerial imagery is seen in FIG. 2, which data corresponds to a site delineated on the land plat shown in FIG. 1.

Once collected, the satellite or aerial data is geo-referenced 330 to define its existence in physical space. Georeferencing as used in this application is the process of scaling, rotating, translating and de-skewing the image to match a particular size and position in space by methods known in the art. For example, physical locations such as cross roads, building corners and the like are frequently stored in various databases in the form of geo coordinates. Further, many points are georeferenced in the land plat (FIG. 1) and can be compared to and associated with physical features imaged in image data that is acquired over a site.

When performing georeferencing, one can initially start with an image in raster from. A raster image, such as a digital satellite photo, is made up of pixels and has no particular size. Without georeferencing, the vectorised CAD/GIS drawing size is determined by the raster's pixel dimensions (the width and height of the raster in pixels). This is in turn determined by the image resolution (DPI). This image sizing will usually bear no relationship with the dimensions of the drawing that the raster represents. Hence georeferencing is needed in order to make the determination of foliage and its location meaningful and accurate.

In practice a pixel of a digital image is selected, which is to be used as a control point. This is typically a feature on the image for which a specific coordinate location can be identified. Once this control point is selected, one usually establishes the desired coordinate for this pixel which is then stored. This is repeated typically for three control points which are then used for image transformation and for accounting for any image distortion.

In this fashion, any subsequent determination of the position of foliage or other features will have a georeferenced set of coordinates that can be provided to CAD, CAM or other systems for use in the present invention.

A computer implemented algorithm is used to analyze the collected imagery data to identify foliage type 340, location 350, and height. Identification of location of the foliage means that each foliage item is independently georeferenced 350.

Figure 4:
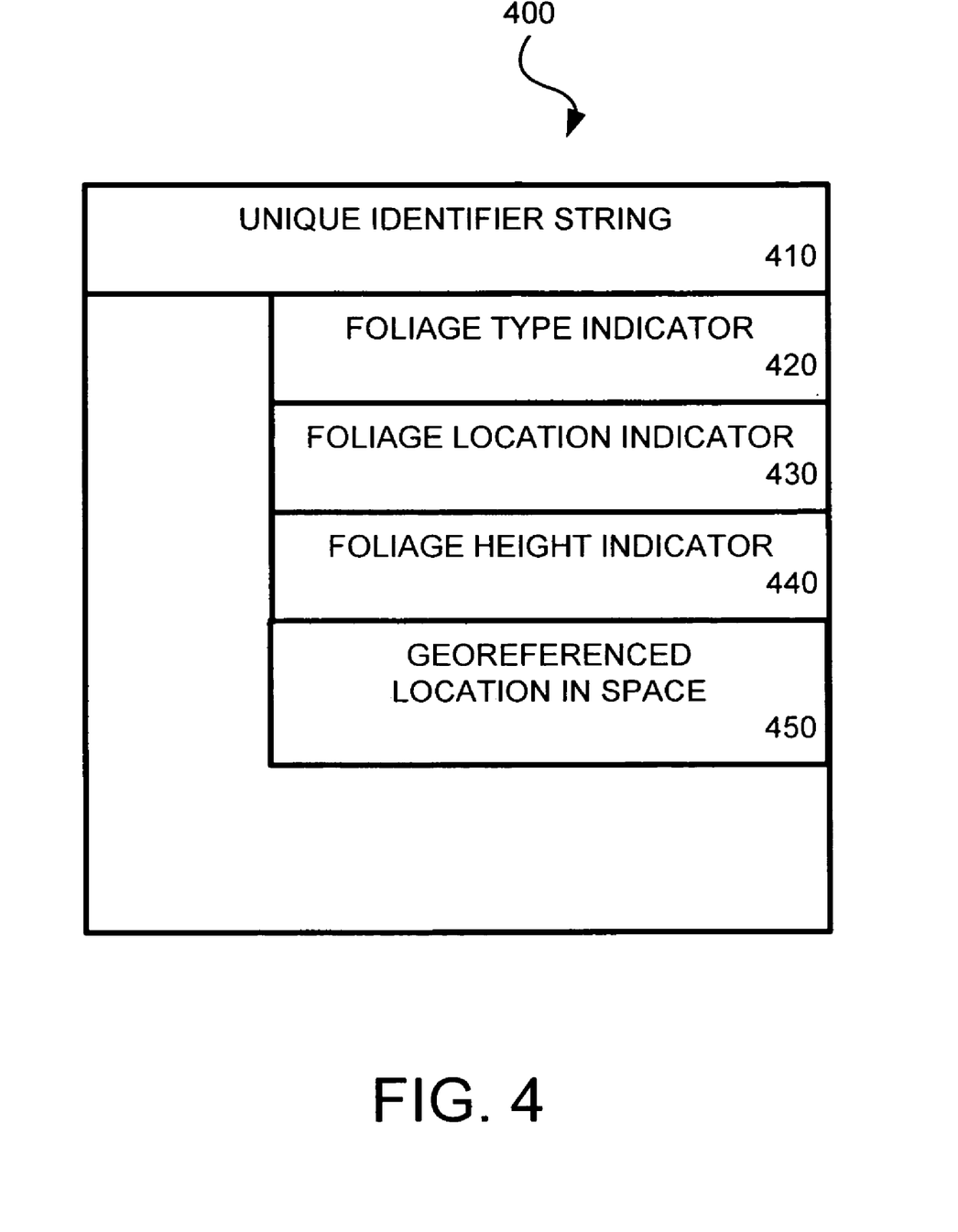
FIG. 4 illustrates a conceptual view of a foliage item data structure according some embodiments of the present invention.

Referring to FIG. 4, when the collected imagery data is analyzed to identify foliage type 340, location 350, and height, a foliage item data structure 400 is established for each distinct piece of foliage that is identified. As each distinct piece of foliage is identified, it is provided a unique identifier string 410. Upon identification of the type of the piece of foliage, a type indicator 420 is stored in the foliage item 400. Upon identification of the location of the piece of foliage within the image, a location indicator 430 is stored in the foliage item 400. Upon identification of the height of the piece of foliage, a height indicator 440 is stored in the foliage item 400. When the foliage item is georeferenced 350, this data regarding the location in space 450 of the piece of foliage is stored in the foliage item data structure 400. Together the foliage items 400 are aggregated as foliage data to be used for integrating 360 with the CAM program of the site model.

Either proprietary or commercially available software is useful to analyze the imagery data in order to determine foliate location, type and height. Algorithms for the identification of foliage from satellite or airborne images have been developed by Pollock (1994), Gougeon (1995), Brandtberg and Walter (1999), Wulder et al. (2000) and McCombs et al. (2003). In general, these algorithms perform digital image classification using the spectral information from digital imagery, and classify each individual pixel based on spectral information. This type of classification is generally termed "spectral pattern recognition." The objective is to assign all pixels in the image to particular classes or themes (i.e. coniferous forest, deciduous forest, etc.). Commercial software packages that provide some of the functionality described herein include eCognition Forester by Definiens and Feature Analyst® by Visual Learning Systems.

This automated approach described above is the preferred mode of practicing the invention. An alternate method is to visually inspect the satellite or airborne imagery and make a visual determination of location, type and height estimates of the foliage. This personal visual inspection approach can be assisted with mapping programs like MapInfo which can place the geo-referenced imagery into the mapping program and place grid lines or other visual aids to help make the analysis of location, type and height more accurate. As an alternative, a landscape plan identifying location, type and size of foliage may be used.

Model foliage is integrated into the site model based on the location, height, and type information obtained from imagery analysis. For an architectural model being built by hand, the location can be mapped onto the model manually for the placement of miniature trees and/or shrubs (Foliage) on the Site Model. For an architectural model being built according to an automated process, the georeferenced location information for the foliage items is integrated 360 with the georeferenced existing CAM program for the site model (refer to FIG. 3). Any discrepancies between the foliage location data and the contour of the site according to the existing CAM program can be reconciled via interpolation or other methods.

For an architectural model being built according to an automated process, once the location and type information has been integrated into the site file, the location and type information is then automatically incorporated 370 into the CAM program (e.g., programmed G-Code language) site model which can generate programming code for commanding operation of a Computer Numerically Controlled (CNC) machine so that a site model produced by the CNC machine is adapted to accommodate the placement of miniature foliage. The location information is used to specify placement of where the CNC machine is to drill a hole and the type information is used to specify the size of the hole to be drilled. Hole depth may also be included in the program.

Once the site model CAM program is determined to be suitable for manufacturing and has been modified to include placements for foliage, a scale check 630 (refer to FIG. 5) is made to ensure that the site model and the building model are of the same scale. For example, if one is sized at "16$^{th}$ scale" (which meaning 1 inch on the model corresponds to 16 feet at full scale) the other will also need to be sized at that same 16$^{th}$ scale. Additionally, a fit check 640 is made to ensure that the building model can be attached to the site model. If these checks are met, the site model CAM program generates the programming codes which are in turn submitted 550 to the subtractive manufacturing equipment for building.

In a situation where only a site model is being made, without integration of a building model, the CNC machine creates 380 the physical model of the location as a site model once the location and type information for the foliage items has been integrated into the site data file and corresponding instructions have been added to the CAM program. This includes drilling of holes for model foliage to be placed (see FIG. 3).

This manufacturing equipment is described as performing a "subtractive" process in that the part (in this case the site model) is created by taking material away from a block of material with milling or routing machinery. The site models can be made from various types of material, such as plastic modeling boards, Styrofoam, Medium Density Fiberboard, or blocks of wood.

When the subtractive manufacturing equipment completes formation of the site model, it can then be hand finished as necessary to ensure the desired look, quality, and finish, after which the site model is ready to be physically integrated 660 with the building model (refer to FIG. 5), in the case where a building model is to be included.

Regardless of whether a building model is to be integrated to the site model or not, foliage may be placed 390, 670 on the site model after the site model has been fabricated. Miniature trees and shrubs are selected based on type and height information obtained from the imagery analysis and place the selected foliage items on the site model based on the location information. Selection based on plant type enables differentiation between evergreen (conifer) trees and deciduous trees, for example. Selection based on height is made in proportion to the scale of the architectural model so that the size of the model foliage accurately represents relative size with respect to the building model.

Each selected foliage item (tree, bush, etc.) is then placed 390, 670 in a pre-formed hole in the site model. If the site model is produced automatically according to the disclosure of the co-pending "Building of Scaled Physical Models" application, the pre-formed hole will have been milled by a CNC machining process using the longitude and latitude determined for that identified foliage item. Each foliage item is preferably secured either with glue or simply by a friction fit of the foliage item's base fitting snugly in its designated hole in the site model.

A benefit of the present invention is that it takes significantly less time and cost less than a traditional survey team approach, while providing high-quality information about foliage location, type and height.

A method for identifying foliage location, type and height on a particular property has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. References to a specific time, time interval, or instantiation are in all respects illustrative and not limiting.

What is claimed is:

1. A method for identifying modeling characteristics of foliage items on a predetermined real property and placement of model foliage in an architectural model, the method comprising:

identifying location of the real property relative to objective coordinates;

collecting imagery data corresponding to the identified location of the real property;

georeferencing the imagery data to the identified location of the real property;

analyzing the imagery data to identify the foliage items on the real property;

analyzing the imagery data to determine, for each of the identified foliage items, location information and type information;

georeferencing each identified foliage item to the identified location of the real property; and modifying a CAM program that produces a computer numerically controlled (CNC) data file corresponding to the real property to include instructions to drill holes for placement of model foliage based upon modeling characteristics and georeferenced information identified for the foliage items and stored in the respective foliage item data files.

2. The method of claim 1, wherein the imagery data is digital data collected from a source selected from the group comprising: satellite imagery and aerial imagery.

3. The method of claim 1, wherein the determined location information indicates, for each respective foliage item, a longitude and latitude.

4. The method of claim 1, wherein the determined type information indicates, for each foliage item, whether the foliage item is a shrub, an evergreen tree, or a deciduous tree.

5. The method of claim 1, wherein the determination of type information is made substantially based upon spectral analysis.

6. The method of claim 1, wherein the determined type information comprises height information.

7. A method for integrating model foliage into a site model corresponding to a predetermined real property, the method comprising:
- identifying location of the real property relative to objective coordinates;
- collecting imagery data corresponding to the identified location of the real property;
- georeferencing the imagery data to the identified location of the real property;
- analyzing the imagery data to identify the foliage items on the real property;
- analyzing the imagery data to determine, for each of the identified foliage items, modeling characteristics comprising location information and type information and storing the determined modeling characteristics in a foliage item data file corresponding to the respective foliage item;
- georeferencing each identified foliage item to the identified location of the real property and storing georeference information in the respective foliage item data file;
- modifying a CAM program that produces a computer numerically controlled (CNC) data file corresponding to the real property to include instructions to drill holes based upon modeling characteristics and georeferenced information identified for the foliage items and stored in the respective foliage item data files;
- commanding a subtractive manufacturing device to fabricate the site model based upon the modified computer numerically controlled (CNC) data file; and
- placing model foliage items on the site model corresponding to the real property based upon the identified modeling characteristics.

8. The method for integrating model foliage into a site model according to claim 7, wherein the CNC data file is selected from the group consisting of: a G-code file, an M-code file, a DNC conversational, and an APT-code file.

9. The method for modeling foliage items according to claim 7, wherein the imagery data is digital data collected from a source selected from the group comprising: satellite imagery and aerial imagery.

10. The method for modeling foliage items according to claim 7, wherein the determined location information indicates, for each respective foliage item, a longitude and latitude.

11. The method for modeling foliage items according to claim 7, wherein the determined type information indicates, for each foliage item, whether the foliage item is a shrub, an evergreen tree, or a deciduous tree.

12. The method for modeling foliage items according to claim 7, wherein the determination of type information is made substantially based upon spectral analysis.

13. The method for modeling foliage items according to claim 7, wherein the modeling characteristics further comprise height information.

14. A method for integrating model foliage into a site model corresponding to a predetermined real property, the method comprising:
- identifying modeling characteristics of foliage items on the real property based substantially on spectral analysis and georeferencing of the foliage items;
- modifying a computer aided manufacturing (CAM) program corresponding to the real property to include instructions to drill holes based upon modeling characteristics identified for the foliage items;
- commanding a subtractive manufacturing device to fabricate the site model based upon programming code generated by the modified CAM program; and
- placing model foliage items on the site model corresponding to the real property based upon the identified modeling characteristics.

15. The method for integrating model foliage into a site model according to claim 14, wherein the identifying of modeling characteristics comprises:
- identifying location of the real property relative to objective coordinates;
- collecting imagery data corresponding to the identified location of the real property;
- georeferencing the imagery data to the identified location of the real property;
- analyzing the imagery data to identify the foliage items on the real property;
- analyzing the imagery data to determine, for each of the identified foliage items, modeling characteristics comprising location information and type information; and
- georeferencing each identified foliage item to the identified location of the real property.

16. The method for integrating model foliage into a site model according to claim 15, wherein the imagery data is digital data collected from a source selected from the group comprising: satellite imagery and aerial imagery.

17. The method for integrating model foliage into a site model according to claim 15, wherein the determined location information indicates, for each respective foliage item, a longitude and latitude.

18. The method for integrating model foliage into a site model according to claim 15, wherein the determined type information indicates, for each foliage item, whether the foliage item is a shrub, an evergreen tree, or a deciduous tree.

19. The method for integrating model foliage into a site model according to claim 15, wherein the determination of type information is made substantially based upon spectral analysis.

20. The method for integrating model foliage into a site model according to claim 15, wherein the modeling characteristics further comprise height information.

* * * * *